(12) United States Patent  (10) Patent No.: US 9,366,147 B2
Gallet  (45) Date of Patent: Jun. 14, 2016

(54) DEVICE FOR SHIFTING A PROPELLER INTO REVERSE, COMPRISING AN ACTUATOR ACTING ON A CRANK PIN

(75) Inventor: Francois Gallet, Paris (FR)

(73) Assignee: SNECMA, Paris (FR)

( * ) Notice: Subject to any disclaimer, the term of this patent is extended or adjusted under 35 U.S.C. 154(b) by 600 days.

(21) Appl. No.: 13/885,133

(22) PCT Filed: Nov. 16, 2011

(86) PCT No.: PCT/FR2011/052669
§ 371 (c)(1),
(2), (4) Date: May 13, 2013

(87) PCT Pub. No.: WO2012/066240
PCT Pub. Date: May 24, 2012

(65) Prior Publication Data
US 2013/0224021 A1  Aug. 29, 2013

(30) Foreign Application Priority Data

Nov. 16, 2010  (FR) ...................................... 10 59398

(51) Int. Cl.
*F01D 7/00* (2006.01)
*B64C 11/32* (2006.01)
(Continued)

(52) U.S. Cl.
CPC ................ *F01D 7/00* (2013.01); *B64C 11/325* (2013.01); *B64C 11/346* (2013.01); *B64C 11/48* (2013.01); *B64D 2027/005* (2013.01); *Y02T 50/66* (2013.01)

(58) Field of Classification Search
CPC ......... F01D 7/00; B64C 11/48; B64C 11/325; B64C 11/346; B64D 2027/005; F05D 2220/325; F05D 2260/79; F05D 2220/324; F05D 2260/50; F05D 2260/56; F05D 2260/74
See application file for complete search history.

(56) References Cited

U.S. PATENT DOCUMENTS 1,829,443 A * 10/1931 Gobereau ............. B64C 11/346
416/53
2,023,684 A * 12/1935 Hubbell ................ B64C 11/346
416/51

(Continued)

FOREIGN PATENT DOCUMENTS

GB  2 218 747  11/1989

OTHER PUBLICATIONS

International Search Report Issued Apr. 27, 2012 in PCT/FR11/52669 Filed Nov. 16, 2011.

*Primary Examiner* — Richard Edgar
*Assistant Examiner* — Eldon Brockman
(74) *Attorney, Agent, or Firm* — Oblon, McClelland, Maier & Neustadt, L.L.P.

(57) ABSTRACT

A device controlling shifting of a propeller turbine engine into reverse mode, by acting on a shaft for controlling pitch of propellers. The device includes: at least one centrifugal weight arranged to drive the propellers into a flag position thereof under action of the centrifugal force; and an actuator that can rotate the control shaft to shift the pitch of the propellers from a traction mode to a reverse mode, passing through a zero pitch position. The centrifugal weight is in an unstable equilibrium position in relation to action of the centrifugal force when the control shaft shifts the pitch of the propellers through the zero pitch position. Further, an actuation mechanism exerts a torque on the control shaft when the centrifugal weight is in the unstable equilibrium position, to prevent it from staying in this position.

14 Claims, 5 Drawing Sheets

(51) Int. Cl.
*B64C 11/34* (2006.01)
*B64C 11/48* (2006.01)
*B64D 27/00* (2006.01)

(56) References Cited

U.S. PATENT DOCUMENTS

| | | | | |
|---|---|---|---|---|
| 2,054,947 A * | 9/1936 | Riddle | ............... | B64C 11/346 416/53 |
| 2,146,334 A * | 2/1939 | De Caria | ............... | B64C 11/346 416/53 |
| 2,693,242 A * | 11/1954 | Elmer | ............... | A63H 27/02 416/139 |
| RE24,530 E * | 9/1958 | Biermann | ............... | B64C 11/346 416/46 |
| 4,913,623 A * | 4/1990 | Schilling | ............... | B64C 11/346 416/129 |
| 8,932,018 B2 * | 1/2015 | Gallet | ............... | B64C 11/325 416/153 |
| 8,944,765 B2 * | 2/2015 | Charier | ............... | F01D 7/00 416/153 |
| 8,985,954 B2 * | 3/2015 | Balk | ............... | B64C 11/32 415/129 |
| 9,085,979 B2 * | 7/2015 | Balk | ............... | B64C 11/306 |
| 2012/0070289 A1 * | 3/2012 | Charier | ............... | F01D 7/00 416/147 |
| 2013/0047756 A1 * | 2/2013 | Gallet | ............... | B64C 11/325 74/89.13 |
| 2013/0183143 A1 * | 7/2013 | Gallet | ............... | F01D 7/00 415/130 |

\* cited by examiner

DEVICE FOR SHIFTING A PROPELLER INTO REVERSE, COMPRISING AN ACTUATOR ACTING ON A CRANK PIN

The field of the present invention is that of aeronautical turbomachines and, more particularly, that of turbine engines with unshrouded propellers referred to as "open rotor" or high-speed-propeller engines and that of the devices for controlling the orientation of the blades of such propellers.

Aeronautical engine technology is evolving rapidly and one of the avenues being explored in an attempt to improve the specific fuel consumption of civilian aircraft engines is currently that of developing open-rotor engines. Such engines, like the one described in patent application FR2941493 by the applicant company, comprise a conventional turbine engine gas generator, one or more turbine stages of which driving an unshrouded fan extending on the outside of the engine. For reasons concerned with the level of thrust to be achieved and in order to reduce the noise generated by the blades, the engine generally has two contra-rotating unshrouded propellers, which means two propellers which rotate in opposite directions and which are situated downstream of the engine in order to keep them as far away as possible from the passenger cabin. The overall configuration of an open-rotor engine is given in FIG. 1.

As is the case in conventional turboprop engines, the blades of the propellers of the open rotors are variable-pitch blades, which means that the pitch of these propellers can be modified during flight in order to alter the thrust generated by the engine and optimize the efficiency of the propeller to suit the speed of the aircraft. Numerous devices have been designed for varying the pitch of the blades and these generally involve rotating the blade about its main axis using bevel gears situated under the blade root, and collaborating with bevel gears belonging to a control system. One example of these devices is given in UK document GB 2218747.

One of the constraints on the propeller blade pitch adjustment control systems is that these blades have to be able to be brought into what is known as the "feathered" position in the event of system failure. The feathered position involves rotating the propeller until its chord is more or less aligned with the direction of the wind, thus minimizing the drag that it generates and, therefore, minimizing the yaw instability induced on the aircraft. The feathered position needs to correspond to a position of equilibrium automatically adopted by the propeller when the pitch control system is no longer transmitting torque. To achieve that, counterbalancing bob weights are generally attached to the bevel gears of the control system and positioned to project in cantilevered manner beyond these. In normal operation, they are held in position by the control system. If this system fails, the action of centrifugal force caused by the rotation of the propeller drives them toward a rest position which corresponds to the position for feathering the blade.

In normal use, during flight phases, the pitch of a propeller changes between two end points corresponding to a low-pitch position at low forward speed, of the order of 30° with respect to the plane of rotation of the propellers, and a high-pitch position at high speed, which is of the order of 65° with respect to this same plane of rotation of the propellers. The feathered position corresponds to a pitch setting higher than that of the high pitch setting and equal to around 90°. Pitch settings under these normal conditions of use are, by convention, referred to as positive pitch settings.

Following landing, the aircraft needs to be slowed down in order to reduce the distance that it rolls and thus allow it to use shorter runways. To achieve that, the engines are put into a position known as the reverse position, which tends to direct their thrust toward the upstream end of the engine. In an open rotor engine, as is already the case with turboprop engines, reverse is obtained by applying a negative pitch angle to the propellers, i.e. by positioning the leading edge of the propeller blades in the rear sector with respect to the plane of rotation of the propeller. This position is obtained by continuing to rotate the propeller, about its longitudinal axis, beyond the low-pitch position until the zero-pitch position, i.e. the position in which the blades lie in the plane of rotation of the propeller, has been crossed and increasing the pitch to a set negative pitch value.

Commonly, the blade root bevel gear creates a reduction ratio of 2 between the pitch angle of the counterweight and the pitch angle of the blade. As a result, rotating the propeller through 90° between the feathered and the zero-pitch position corresponds to the bob weights rotating through 180°, causing them to move from the upper, and therefore stable, vertical position of feathering into an unstable lower vertical position situated opposite the former position.

One of the problems that needs to be overcome in such engines, whether they be open rotor or turboprop engines, is that of ensuring that the bob weights do not remain in this unstable position when the pilot commands the shift into reverse, and that of being certain that the propeller blades are indeed in a negative-pitch position when the pilot reapplies power after landing. If such is not the case, the opening of the throttle will cause the engine to run away if the propellers are still at a zero pitch setting, with the risks of over speed and therefore blade breakage or even will result in the propellers applying traction if the pitch setting has remained in the positive pitch settings domain, even though the pilot was expecting these propellers to afford a braking action.

It is therefore important to make sure that the propellers do indeed shift beyond the zero-pitch position during a shift into reverse, i.e. that the bob weights do not remain in the unstable position located between the positive pitch settings and the negative pitch settings.

It is an object of the present invention to address these disadvantages by providing a device for controlling the pitch of a propeller which guarantees that the bob weights will shift beyond the zero-pitch position in the event of a demand to shift into reverse.

To this end, one subject of the invention is a device for controlling the shift into reverse of a propeller-type turbomachine, through action on a pitch control spindle that controls the pitch of said propellers, said device comprising at least one bob weight mounted with overhang on said control spindle and designed to drive said propellers toward their feathered position under the action of the centrifugal force generated by the rotation of the turbomachine, the device also comprising an actuator able to cause said control spindle to turn in order to shift the pitch of the blades from a traction mode to a reverse mode, passing via a zero-pitch position, characterized in that the bob weight is in a position of unstable equilibrium with respect to the action of the centrifugal force when said control spindle causes the pitch of the propellers to pass via the zero-pitch position.

Combining unstable equilibrium of the bob weight with the zero-pitch position of the propellers makes it possible to guarantee that the propellers will not remain in a zero-pitch position, as this could lead to engine failure if the pilot reopened the throttle in this position.

For preference, the device comprises an actuating means that applies a torque to said control spindle when the bob weight is in said position of unstable equilibrium, so as to prevent it from remaining in that position. The propellers will thus not return to traction mode as this configuration too would present a danger if the pilot opened the throttle believing the engine to be in reverse.

Advantageously, said actuating means applies a torque to said spindle both during the shift from traction mode to reverse mode and during the return from reverse mode to traction mode. This then guarantees that the propellers do actually shift to the desired configuration, whether this be reverse or traction.

For preference, the actuator applies no torque to said control spindle when the bob weights are in the position of unstable equilibrium. This configuration eliminates any possible interference between the torques applied to the control spindle by the device for shifting into reverse and by the actuator. It simplifies the development of the device for shifting into reverse.

In a preferred embodiment, said actuating means applies its torque to said control spindle via a crank pin mounted with freedom to rotate via one of its ends on said bob weight.

Advantageously, said actuating means is held at one of its ends by a pivot spindle offset parallel to the control spindle and is returned in rotation about this spindle, toward the crank pin, via means that creates a return torque.

For preference, the crank pin at its free end bears a transfer means able to collaborate with said actuating means so as to transfer the torque supplied by said actuating means to the control spindle.

In one particular embodiment, said actuating means is a tongue and the transfer means is a rod configured to slide along said tongue during the shift into reverse.

More preferably, said tongue at its free end comprises a retaining means able to limit the sliding of said rod along the tongue during the shift into reverse, so as to provide a purchase for said crank pin.

In a preferred embodiment, said rod is in abutment against said retaining means before said bob weight reaches its position of unstable equilibrium. Advantageously, as said bob weight enters its position of unstable equilibrium, the rod is in abutment against said retaining means and the crank pin is oriented in such a way as to push the bob weight beyond said unstable position.

In one particular embodiment, the control device comprises two actuating means such as described hereinabove, a first means applying a torque to the crank pin for the shift from the position of use to the reverse position and the second means applying a torque to said crank pin for the return to the position of use.

The invention also relates to a propeller for a turbomachine comprising a blade root equipped with a device for controlling the shift into reverse as described hereinabove, or even to a turbomachine comprising at least one such propeller.

The invention will be better understood and other objects, details, features and advantages thereof will become more clearly apparent during the course of the detailed explanatory description which will follow, of one purely illustrative and nonlimiting exemplary embodiment of the invention, given with reference to the attached schematic drawings.

Figure 1:
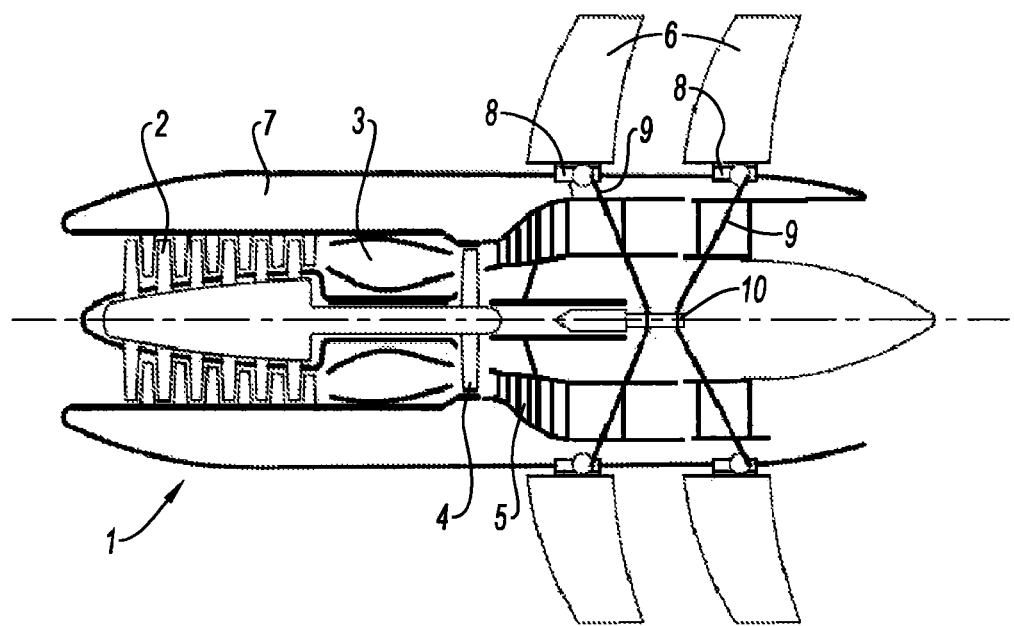
FIG. 1 is a schematic view in cross section of a high-speed propeller turbine engine.

Reference is made to FIG. 1 which shows a high-speed propeller turbine engine 1 comprising, on the one hand, a conventional gas generator consisting, among other things, of a compressor 2, of a combustion chamber 3 and of a turbine 4 which drives the compressor 2 and, on the other hand, a free turbine 5 situated downstream of the coupled turbine 4, which drives the two series of blades of the contra-rotating propellers 6. The propellers are positioned on the outside of the casing 7 of the gas generator and their blades are held by a blade root 8 capable of rotating about an axis that is radial with respect to the turbomachine 1 and which passes through the center of the blade root and constitutes the main axis of the blade. The blade is rotated by an actuator, taking the form of a linkage 9, which acts on a pair of bevel gears one of which is fixed to the blade, surrounding the blade root 8. As indicated earlier, the size of these bevel gears gives rise to a reduction ratio of 2, such that the propeller describes the path between its feathered position and its zero-pitch position when the associated bob weights rotate through 180° C. A control system 10, via the linkages 9, controls the angular position of the blades of each of the propellers 6 and ensures that they rotate synchronously.

Figure 2:
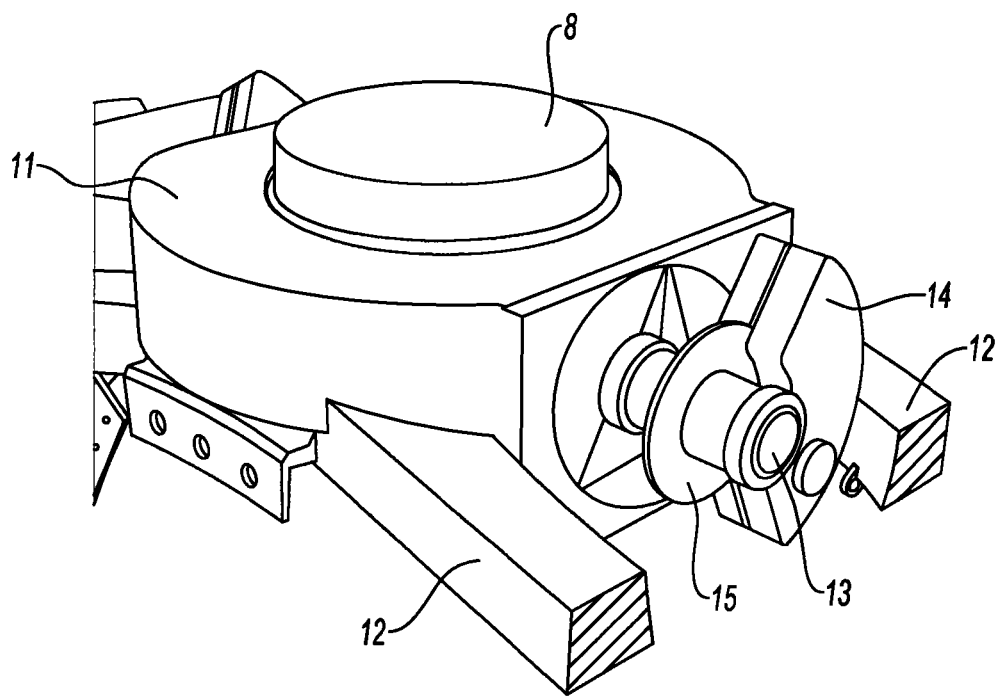
FIG. 2 is a perspective view of a device for controlling the pitch of the blades of the turbine engine of FIG. 1, according to one embodiment of the invention.

FIG. 2 shows a protective enclosure 11 of the blade pitch control device according to the invention, which surrounds the blade root 8 and is fixed to the blade retaining ring 12. This rotary ring secures the blades to the shaft of the engine and turns them to generate thrust. The enclosure 11 is essentially in the form of a cylinder surrounding the blade root 8 and comprising a lateral window from which a control spindle 13 emerges, this spindle bearing bevel gears which mesh with blade root bevel gears to control the pitch of the blade. Fixed to this spindle, to project in cantilevered manner beyond it, are bob weights 14 in the form of two angular sectors centered on the spindle, which are positioned side by side and fixed to a disk 15 push-fitted onto the support spindle 13. These two sections are angularly positioned in such a way that, under the action of centrifugal force, they apply a torque that tends to cause the spindle 13 to rotate and thereby cause the blades of the propeller 6 to rotate toward their feathered position.

Figure 3:
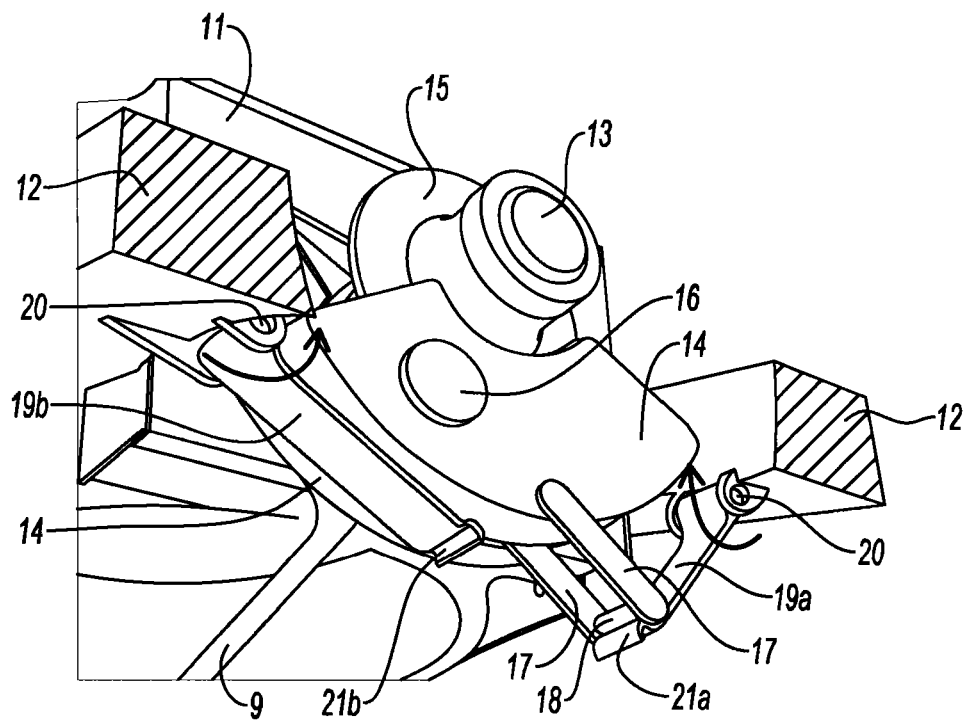
FIG. 3 is a detailed view showing the actuator of the control device of FIG. 2.

Reference is now made to FIG. 3 which shows the device for controlling the pitch of the blades 6. The linkage 9 is fixed, at its external end, to the bob weights 14 via a journal 16 which passes through the two bob weights, running parallel to the spindle 13 and offset laterally with respect to that spindle. The connection between the external end of the linkage 9 and the journal 16 is a connection with freedom to rotate about the journal, so that the linkage 9 can turn the bob weights 14 through its longitudinal movement, acting as a connecting link rod.

Each of the bob weights 14 also bears a spindle on which is mounted a crank pin 17 having the form of a metal strip able to rotate in a plane perpendicular to the control spindle 13. The axis about which the crank pins rotate is positioned on the bisector of the angular sectors constituting the bob weights 14, on the side external to the bob weights in order to give the crank pins 17 the longest possible level arm. The two crank pins 17 move about their common axis, remaining parallel to one another, their free ends being connected by a link rod 18 extending in the direction of the control spindle 13.

At the same time, the retaining ring 12 bears, on each side of the root of the blade of the propeller 6, two tongues 19, i.e. two components in the shape of tabs which are fixed to the ring 12 by one of their ends, by means of a spindle 20 about which they can turn. It is possible to make out a first tongue 19a which acts during the shift into reverse and a second tongue 19b which itself acts during the return to normal operation. Torsion springs (not depicted), borne by these tongue spindles 20, return the tongues toward the bob weights 14 and toward the median plane of the retaining ring 12. The tongue spindles 20 are positioned on the retaining ring 12 on either side of the blade root, at points which are laterally separated with respect to the control spindle 13 so that the tongues face one another and, via their free end, butt against the bob weights 14 when there is no interference between them and the crank pins 17. The tongues 19 each have a flat tab-like shape extending in a plane parallel to the control spindle 13, from the spindles 20 as far as a free end 21 which is hooked. This hooked end is intended to act as an end stop to the link rod 18 when it slides along said tongue. The hook has a double hook shape which first of all stands up toward the bob weights 14 to act as an end stop as indicated previously but which then bends over in the opposite direction to act as an engagement ramp for said link rod 18. This rod can thus return to the tongue 19 after having left it, in order to slide along it in the continuation of its movement as will be explained later on.

Whereas the linkage 9 acts as an actuator to bring about the rotation of the bob weights 14 and, as a result, of the gears borne by the control spindle 13, the assembly made up of the tongues 19 and the crank pins 17 acts as an additional actuator for rotating these bob weights by transmitting to them, under certain operating conditions, the torque that is supplied by the return springs mounted on the tongue spindles 20.

Figure 4:
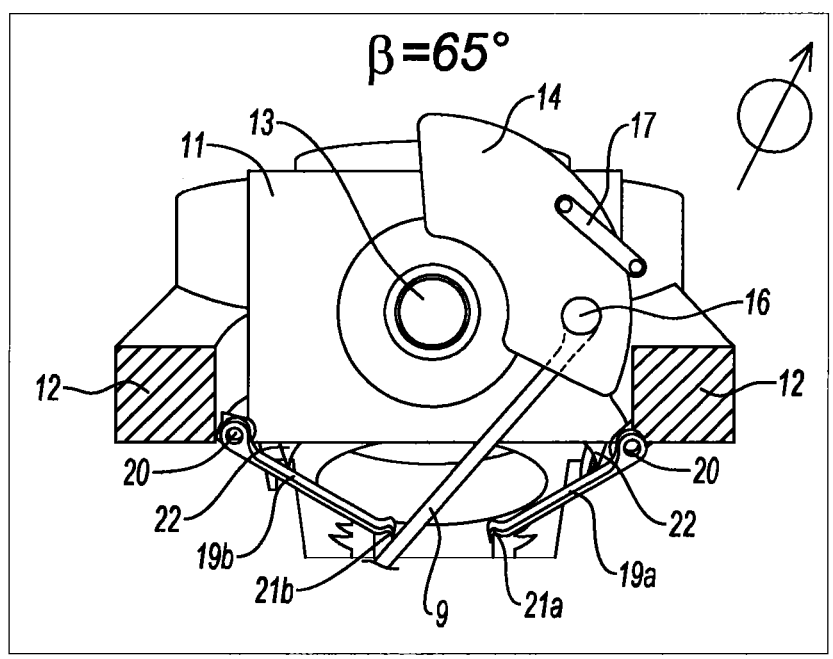
FIG. 4 is a face-on view of the device of FIG. 2, the pitch of the propeller corresponding to the cruising position.
Figure 7:
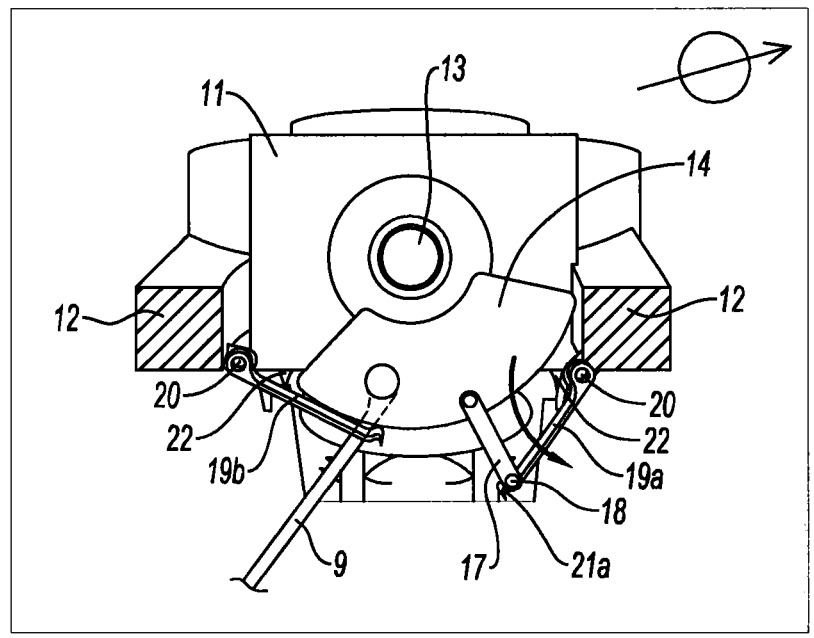
Figure 8:
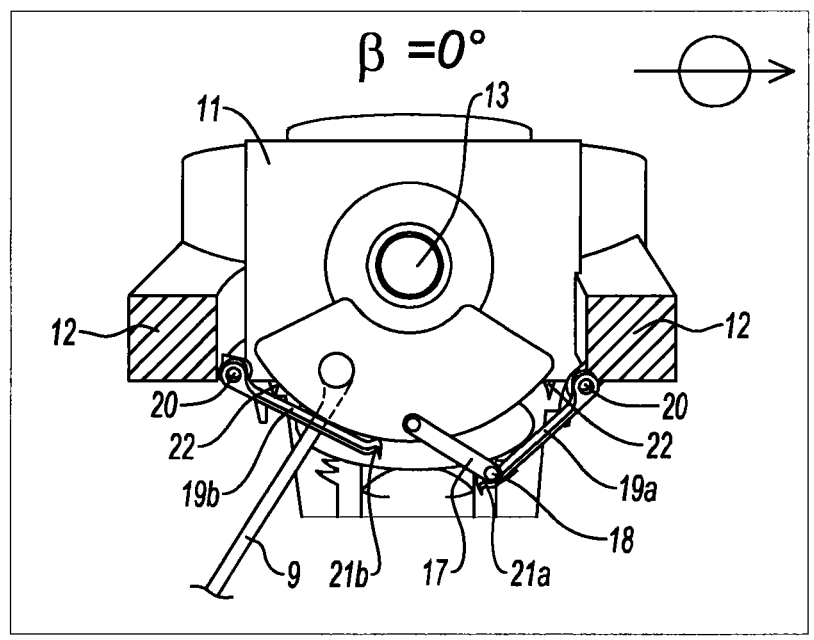
Figure 9:
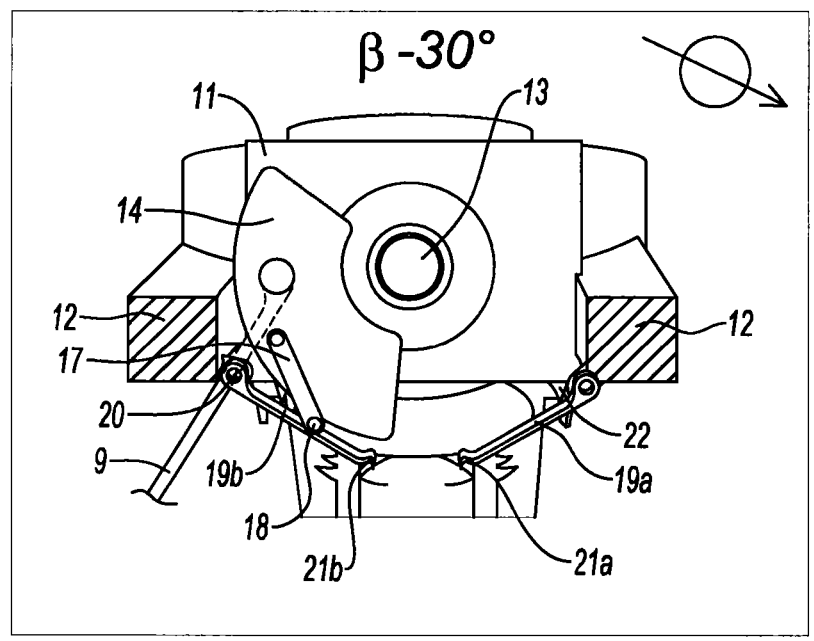
FIG. 9 is a face-on view of the device of FIG. 2, with the pitch of the propeller being in its final position, corresponding to a low pitch in reverse.

Whereas FIG. 4 shows the relative position of all the elements involved in controlling the pitch of the propellers 6, in cruising operation, FIGS. 5 to 9 detail how this position changes during a shift into reverse from low idle on the ground (FIG. 5) to the reverse position (FIG. 9). These figures also show, top right, the orientation of the propeller with respect to the zero-pitch setting and the pitch angle β of this propeller.

In FIG. 4, which illustrates cruising operation, the bob weights 14 are in a part-way-up position, a position of equilibrium imposed by the position of the linkage 9, the equilibrium being the balance between the centrifugal force exerted by the rotation of the ring 12, which has a tendency to drive the bob weights upward, and the traction imposed by the linkage 9, which opposes this rotation. This position of the bob weights corresponds to an angular position of the spindle 13 that gives the propeller the pitch setting β demanded by the control system 10, which is somewhere between the low-pitch position and the high-pitch position. It may be noted that, in this position, the crank pin 17 is not in contact with the first tongue 19a, its link rod 18 being free to position itself against the bob weights 14 and to accompany any rotations demanded by the control system 10 of these bob weights and of the control spindle 13. The two tongues 19 are returned toward the control spindle 13 by their torsion return spring and adopt a standby position in which each is in abutment against a spur 22 borne by the retaining ring 12.

Figure 5:
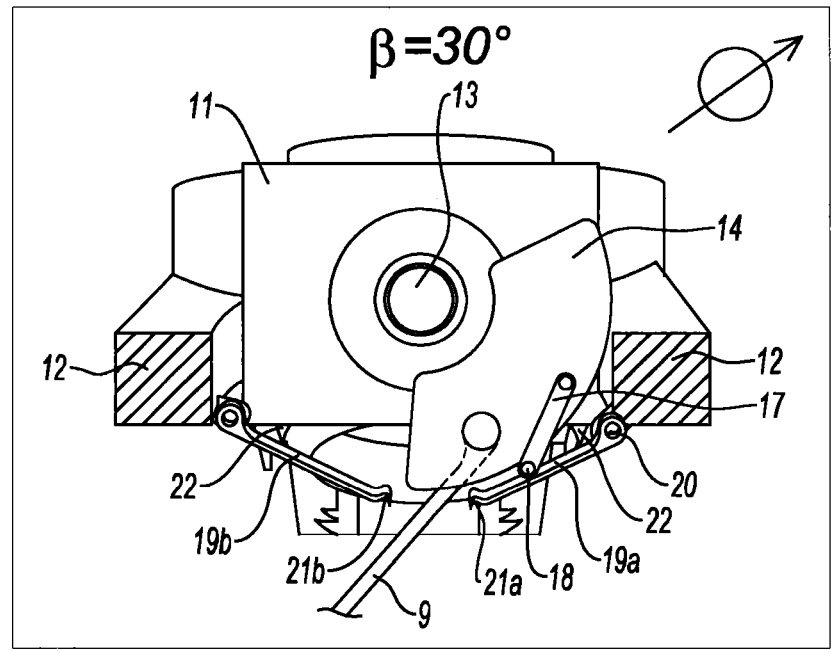
FIG. 5 is a face-on view of the device of FIG. 2, the pitch of the propeller corresponding to the low-pitch position, the engine being at low idle on the ground.

In FIG. 5, the propeller is in a position corresponding to the position of low idle on the ground, during landing, which corresponds to the low-pitch position. The pitch angle β has decreased by comparison with the value it had in cruising flight and the bob weights 14 have moved toward the bottom of the figure, i.e. in the direction toward zero pitch. In this position, the crank pin 17 has moved closer to the tongue 19a and its link rod has come into contact therewith. For the moment, no load is applied by the tongue to the link rod, this tongue still resting against the spur 22.

Figure 6:
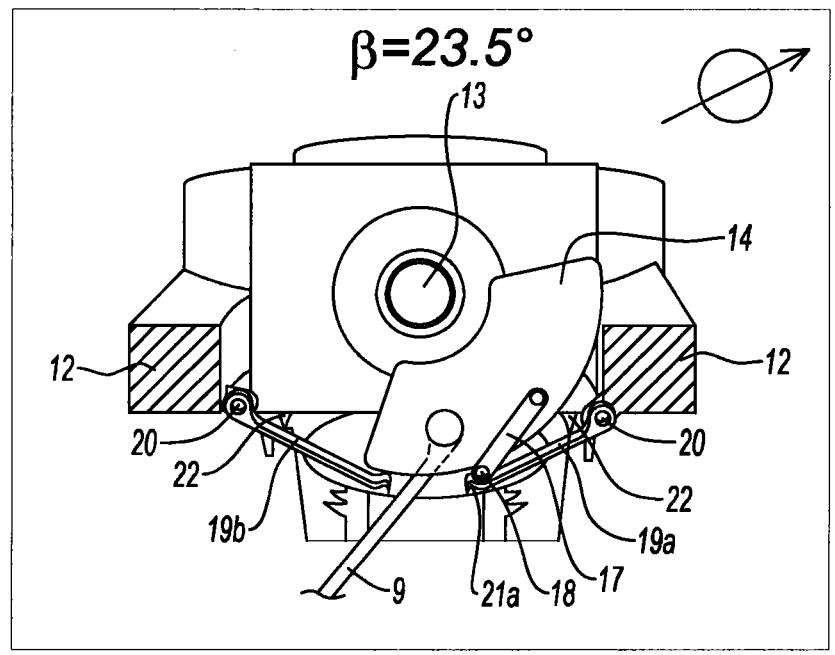
FIGS. 6 to 8 are successive face-on views of the device of FIG. 2, with the pitch of the propeller changing progressively from the low-pitch position of low idle on the ground to the position of low-pitch in reverse.

In FIG. 6, the propeller is in an intermediate position in its rotation to shift into reverse, in response to traction applied by the control system 10 to the linkage 9. The bob weights 14 have moved beyond the position of low pitch, although the pitch angle is still positive. By comparison with FIG. 5, the link rod 18 has slid along the tongue 19a, which remains resting against the spur 22, and has come into contact with the lip formed by the hook 21a of this tongue.

In FIG. 7, the propeller is in a position that is even further advanced toward zero pitch, while still maintaining a positive pitch angle. The crank pin 17, the free end of which is immobilized by the hook 21a, has performed a rotation which now brings it substantially perpendicular to the first tongue 19a. This rotation has been possible only through a thrusting action of the crank pin on the tongue 19a which moves away from the spur 22. The torsion return spring situated on the spindle of the tongue is therefore compressed and its return force, in response, causes the tongue to thrust against the crank pin 17 and, ultimately, against the bob weights 14.

In FIG. 8, the propeller is in the zero-pitch position, the position of the bob weights corresponding to their position that is unstable in terms of rotation about the control spindle 13, under the action of centrifugal force. The free end of the crank pin 17 and the link rod 18 are still restrained by the hook 21a. In this situation the linkage 9 is pulled to the maximum and its orientation is such that it points toward the control spindle 13; it therefore no longer has any action in driving the rotation of the bob weights 14 and cannot allow them to pass through the bottommost point in order to arrive at negative pitch settings. By contrast, the geometric configuration given to the crank pin—tongue assembly is such that the force applied by the tongue does not pass through the control spindle 13 and pushes the bob weights beyond their present position. The bob weights 14 cannot therefore remain in this unstable position, this being the stated objective of the invention.

In FIG. 9, the propeller is in reverse. The devices contributing to controlling the pitch thereof are in a position that is symmetrical with that that they have in low idle on the ground, under normal use. The bob weights 14 are in a mid-way-up position, in equilibrium between a centrifugal force that has a tendency to move them toward feathering with negative pitch angles, and traction of the linkage 9 which fixes their position so that the pitch angle in reverse corresponds to that which gives the engine the best reverse thrust. The crank pin 17 has been driven by the bob weights 14 and has escaped the action of the hook 21a of the first tongue 19a; it has slipped under the second tongue 19b, the one associated with negative pitch angles, using the ramp of the hook 21b thereof. As in FIG. 5, the link rod 18 is bent back against the bob weights 14 under the action of the second tongue and the return spring thereof and the second tongue 19b rests against the corresponding spur 22.

The way in which the control device according to the invention works will now be described with detailed attention given to the change in pitch angle of the propellers of a high-speed propellers engine shifting from the cruising position to the reverse position so that the aircraft can land.

In normal operation, in cruising flight or during the final approach before landing, the pitch angle of the propellers 6 is somewhere between the low-pitch position and the high-pitch position, in a configuration described in FIG. 4. The bob weights 14 are restrained by the linkage 9 which prevents them from moving into the feathering position under the action of the centrifugal force applied to them. The crank pins 17 are free to rotate about the journal 16 of the bob weights and the link rod 18 does not interfere with the first tongue 19a. The pitch angle of the propellers is usually set by action of the linkage 9 on the bob weights, without the device for assisting in shifting into reverse playing any part in this.

After the aircraft has landed, the pilot throttles back and brings the engine to low idle, which results in the propellers being set to the low pitch angle position illustrated in FIG. 5. In order to achieve that, the control system 10a has pulled on the linkage 9 and caused the bob weights 14 to rotate toward a position corresponding to a pitch angle of 30°. In this position, the crank pins 17 have arrived in a bottom position, in which the link rod 18, by design, comes into contact with the first tongue 19a. This contact between the link rod 18 and the first tongue occurs more or less in the middle of this tongue, without any pressure yet being applied between the two components.

The pilot then begins the shift into reverse by commanding the control system to pull on the linkage 9 to bring it into its most retracted possible position in relation to the bob weights 14. These then rotate toward their position corresponding to zero pitch angle, trailing in their wake the crank pins 17 and the link rod 18. The latter slides first of all along the first tongue 19a until it becomes wedged against the hook 21a (the position illustrated in FIG. 6). Beyond this position, as the bob weights 14 continue to rotate, they carry with them the crank pins 17 which gradually push on the tongue 19a, separating it from the bob weights and compressing the torsion return spring situated on the rotation spindle 20 thereof (cf. FIG. 7).

Because of the continuing action of the linkage 9, the bob weights arrive at a position of symmetry about the median plane of the retaining ring 12, which corresponds to their position of unstable equilibrium (cf. FIG. 8). In this position, the linkage 9 is pulled to the maximum extent by the control system 10 and finds itself pointing in the direction of the control spindle 13; it therefore has no further effect on the rotation of the bob weights 14 and cannot prolong it with additional pulling. By contrast, when the bob weights are in this position of unstable equilibrium, the crank pins 17 receive thrust from the first tongue 19a, which originates from the reaction torque provided by its torsion spring. This thrust is not itself oriented toward the control spindle 13 but points to the side of negative pitch angles. The bob weights are thus made to continue their rotation and to escape from this position of unstable equilibrium, and this provides a solution to the technical problem that the invention set out to address.

From there, the centrifugal force applied to the bob weights 14 naturally causes them to continue the rotation which increases the pitch angle of the propellers, in the direction of negative pitch angles. The linkage 9 is left free so as to allow this movement to occur until a preprogrammed angular position is reached. This rotation moreover causes the link rod 18 to escape from the hook 21a of the first tongue, and this link rod then comes up against the hook 21b of the second tongue 19b. The ramp shape given to the end of the hook allows this rod 18 to slide along it and to slot in between the second tongue 19b and the bob weights 14, thus setting in place the elements needed to ensure that the bob weights will move through their point of unstable equilibrium on the return to normal control.

The system comes to rest in a position in which the linkage 9 blocks any subsequent movement and compensates for the action of this centrifugal force (cf. FIG. 9). The position adopted is chosen by the designer of the device to give the propellers a pitch angle of a magnitude that provides the best reverse traction, bearing in mind the engine speed imparted to the engine in the reverse situation. As depicted in FIG. 9, without this value being an imperative, the reverse pitch angle corresponds, in negative, to the pitch angle for low idle on the ground (−30°).

The return to the normal use position takes place in a similar way, the movement through the point of unstable equilibrium being achieved by virtue of a thrust generated by the second tongue 19b, which acts in the same way as the first tongue 19a did during the shift into reverse, but pressing this time against the hook 21b of the second tongue 19b.

The invention claimed is:

1. A device for controlling a shift into reverse of a propeller-type turbomachine, through action on a pitch control spindle that controls a pitch of propellers, the device comprising:
   at least one bob weight mounted on and so as to project in cantilevered manner beyond the control spindle and configured to drive the propellers toward their feathered position under action of centrifugal force generated by rotation of the turbomachine;
   an actuator configured to cause the control spindle to turn to shift the pitch of the propellers from a traction mode to a reverse mode, passing via a zero-pitch position; and
   an actuating means that applies a torque to the control spindle when the control spindle turns to shift the pitch of the blades via a zero-pitch position, so as to prevent the control spindle from remaining in that position.

2. The device as claimed in claim 1, wherein the bob weight is in a position of unstable equilibrium with respect to the action of the centrifugal force when the control spindle causes the pitch of the propellers to pass via the zero-pitch position.

3. The device as claimed in claim 1, wherein the actuating means applies a torque to the control spindle both during the shift from the traction mode to the reverse mode and during a return from the reverse mode to the traction mode.

4. The device as claimed in claim 1, wherein the actuator applies no torque to the control spindle when the bob weights are in the position of unstable equilibrium.

5. The device as claimed in claim 1, wherein the actuating means applies its torque to the control spindle via a crank pin mounted with freedom to rotate via one of its ends on the bob weight.

6. The device as claimed in claim 5, wherein the actuating means is held at one of its ends by a pivot spindle offset parallel to the control spindle and is returned in rotation about the pivot spindle, toward the crank pin, via a mechanism that creates a return torque.

7. The device as claimed in claim 6, wherein the crank pin at its free end bears a transfer means for collaborating with the actuating means so as to transfer the torque supplied by the actuating means to the control spindle.

8. The device as claimed in claim 7, wherein the actuating means includes a tongue and the transfer means includes a rod configured to slide along the tongue during the shift into reverse.

9. The device as claimed in claim 8, wherein the tongue at its free end comprises a retaining means for limiting the sliding of the rod along the tongue during the shift into reverse, so as to provide a purchase for the crank pin.

10. The device as claimed in claim 9, wherein the rod is in abutment against the retaining means before the bob weight reaches its position of unstable equilibrium.

11. The device as claimed in claim 10, wherein the bob weight enters its position of unstable equilibrium, the rod is in abutment against the retaining means and the crank pin is oriented to push the bob weight beyond the unstable position.

12. A control device comprising:
   the device of claim 1;
   said actuating means comprises two actuating means;
   a first means applying a torque to the crank pin for a shift from a position of use to the reverse position; and
   second means applying a torque to the crank pin for return to the position of use.

13. A turbomachine propeller comprising a blade root including a device for controlling the shift into reverse as claimed in claim 1.

14. A turbomachine comprising at least one propeller as claimed in claim 13.

* * * * *